United States Patent [19]

Schluenz et al.

[11] 4,080,320

[45] Mar. 21, 1978

[54] RESINOUS TERPENE MALEIMIDE AND PROCESS FOR PREPARING THE SAME

[75] Inventors: Robert William Schluenz; Curry Beach Davis, both of Panama City, Fla.

[73] Assignee: Arizona Chemical Company, Wayne, N.J.

[21] Appl. No.: 678,084

[22] Filed: Apr. 19, 1976

[51] Int. Cl.$^2$ .................. C07D 209/34; C08G 73/16; C08K 5/01; C08K 5/02

[52] U.S. Cl. .................. 260/78 UA; 260/31.2 N; 260/32.8 N; 260/33.2 R; 260/33.4 R; 260/33.6 UA; 260/33.8 UA; 260/326 C; 260/326 N; 260/326.5 FM

[58] Field of Search ......... 260/78 UA, 326 C, 326 N, 260/326.5 FM

[56] References Cited

U.S. PATENT DOCUMENTS

| 3,043,789 | 7/1962 | Cyba | 526/75 |
|---|---|---|---|
| 3,583,948 | 6/1971 | Blechinger | 260/78 UA |
| 3,748,340 | 7/1973 | Hayes | 260/326 C |

OTHER PUBLICATIONS

N. V. Koninklijke — Chem. Abs. 51, 12136h (1957).

*Primary Examiner*—Donald E. Czaja
*Assistant Examiner*—H. H. Fletcher
*Attorney, Agent, or Firm*—Harry H. Kline

[57] ABSTRACT

There are provided resinous terpene maleimides useful as tackifiers for elastomers and prepared by reacting at tempertures between 140° C. and 200° C. substantially equimolar amounts of (a) non-conjugated monocyclic terpenes or mixtures thereof and (b) maleic acid anhydride in the presence of from 0.05% to 0.15% iodine, based on the weight of the terpene, recovering a mixture of not less than 95% mono-adduct and not more than 15% di-adduct of terpene maleic adduct, further reacting said adduct mixture with stoichiometric amounts of an aliphatic polyamine, and recovering terpene maleimide having a number average molecular weight between about 500 and about 600.

8 Claims, No Drawings

RESINOUS TERPENE MALEIMIDE AND PROCESS FOR PREPARING THE SAME

The present invention relates to novel resinous terpene maleimides, a process for preparing the same, and the novel utilization of the same as tackifiers for polar elastomers. More particularly, it relates to terpene maleimides prepared from a mixture of terpene maleic anhydride adducts containing not less than 85% terpene maleic anhydride mono-adduct and not more than 15% terpene maleic anhydride di-adduct.

It is known that polyimides can be variously prepared from dianhydrides and diamines. However, as far as can be determined, resinous imides of terpene-mono anhydride adducts and diamines yielding a terpene-imide-terpene configuration are not known. If the latter can be attained, such would amount to a substantial advance in the art.

It has been unexpectedly found that terpene maleimides can be prepared in a straightforward manner by reacting terpene maleic anhydride adducts containing not less than 85% mono-adducts with a diamine at elevated temperatures. The resultant terpene maleimide having primarily a terpene-imide-terpene configuration finds utility, particularly, as a tackifier for polar elastomers.

According to the invention, substantially stoichiometric amounts of terpene maleic anhydride adduct and a diamine, such as ethylene diamine or trimethylene diamine are reacted at elevated temperatures in the range of from about 140° C. to about 240° C. so as to recover a resinous terpene maleimide.

In general, the terpene maleic anhydride adduct reactant can be prepared by reacting equimolar amounts of non-conjugated terpene, such as limonene, terpinolene, 1,4 para-methadiene terpineol, 1,4-cineole, or 1,8-cineole, or mixtures of the same, with maleic anhydride at temperatures ranging from about 175° C. to about 200° C. in the presence of from about 0.05% to 0.15% iodine, based on the weight of the terpene. Resultant adduct comprises a mixture of at least 85% mono-adduct and 15% di-adduct.

Exemplary of the diamines which can be employed are trimethylene diamine, ethylene diamine, propylene diamine, as well as diethylene triamine.

To facilitate a further understanding of the invention, the following examples are presented primarily for purposes of illustrating the more specific details thereof. The invention is not to be limited thereby except as defined in the instant claims. Unless otherwise stated, the parts are by weight.

EXAMPLE 1

This example illustrates the overall process of the invention.

To a suitable flask equipped with an overhead stirrer, addition funnel, thermometer, nitrogen inlet, and a condenser above a water trap filled with toluene which is placed over a short, packed column are added 588 parts of maleic anhydride and 30 parts (by volume) of toluene. The mixture is heated to 200° C. for about 30 minutes. During this time, the system is dried by the refluxing toluene-water azeotrope. The temperature is reduced to 170° C. -180° C., or below reflux, and 1.1 parts (0.12%, based on the weight of the terpene to be added) of iodine are added. Next, 906 parts of terpene fraction containing about 90% terpinolene and the remainder being monocyclic terpene hydrocarbons and terpene alcohols are introduced and maintained at a temperature of about 180° C. This temperature is raised to 190° C. -195° C. after addition of the latter terpene fraction and reflux is maintained by periodic addition of toluene. Thereafter, the temperature is raised to 200° C. and held for 2 hours. The reaction mixture is cooled to 100° C. A distillation head is attached and vacuum then applied. The temperature is next raised to 160° C. and steam is introduced for a 15 minute steam stripping at a temerature of about 200° C.

There is recovered a yield of 1360 parts of a maleic anydride terpene adduct mixture comprising 95% monoadduct and about 5% di-adduct. The percentages are determined by gel permeation chromatography. The resultant mixture which is obtained in 91% yields is a pale yellow liquid.

The product, terpene-imide-terpene type configuration, is next prepared by reacting 588 parts of the adduct mixture with 77 parts of ethylene diamine in 200 parts (by volume) of xylene. The ethylene diamine is slowly added to the adduct at 140° C. and any product water is removed as an azeotrope. When the addition of the diamine is complete, the kettle temperature is slowly raised to 240° C. with the removal of water and solvent. After reaching 240° C. kettle temperature, the product is vacuum steam stripped at 100 mm Hg. for 3 hours to remove volatile oils. The stripped resin is then cooled and drummed or flaked and bagged.

The product which is a resinous terpene maleimide is recovered and possesses the following properties:

| | |
|---|---|
| Softening Point (° C.) | 88 |
| Acid Number | 1 |
| Number Average Molecular Weight | 533 |
| Cloud Point<sup>a</sup>° C | 159 |

<sup>a</sup>Cloud point is determined by admixing 2.5 parts of resultant resin with 10 parts of a 1:1 mixture of Elvax 150 ® (33% vinyl acetate-ethylene copolymer) and Ceraltak ® (microcrystalline wax m.p. 165° F.), melting to a clear melt, and allowing the melt to cool slowly until it clouds.

EXAMPLE 2

The process of Example 1 is repeated in every detail except that the terpene fraction therein is substituted by 930 parts of a terpene fraction comprising about 40% terpinolene, 25% dipentene, 30% 1,4-cineole and the balance being terpene hydrocarbons and terpene alcohols.

EXAMPLE 3

Repeating the procedure of Example 1 in every detail except that 97% limonene is substituted for the terpene fraction mixture therein. There is obtained a limonene maleic anhydride adduct in a yield of about 92% having more than 95% mono-adduct in said mixture and being a light yellow liquid .

EXAMPLE 4

The terpene imides as prepared by the procedure of Examples 1 and 2 are compounded with additives into three hot melt formulations utilizing ELVAX ®250 (28% vinyl acetate - 72% ethylene copolymer); ELVAX ®150 (33% vinyl acetate - 67% ethylene copolymer); ELVAX ®40 (40% vinyl acetate - 60% ethylene copolymer); SHELLWAX ® 300 (paraffin wax mp= 159° F.) The formulations are tabularized below:

TABLE I

| COMPOSITIONS | FORMULATIONS | | |
| --- | --- | --- | --- |
| | A<br>Parts by Wt. | B<br>Parts by Wt. | C<br>Parts by Wt. |
| Terpene Imide of Ex. 1 | 40 | — | 40 |
| Terpene Imide of Ex. 2 | — | 40 | — |
| Elvax ® 250 | 40 | — | — |
| Elvax ® 150 | — | 40 | — |
| Elvax ® 40 | — | — | 40 |
| Shellwax ® 300 | 20 | 20 | 20 |

The formulas (A, B, and C above) are employed at a coating on one (1) of a plurality of substrates (i.e., substrates 1 below) which are then sealed to a second substrate 2 at 225° F. for a 0.3 sec. under ten pounds per square inch (10 psi) pressure. The peel strength is next determined by Instron testing in ounces per inch according to pressure sensitive tape Council method (PSTC - 1). The results are tabularized below:

TABLE II

| Substrates | | Peel Strength (oz/in) of Formulation (TABLE I) | | |
| --- | --- | --- | --- | --- |
| 1 | 2 | A | B | C |
| Kraft | Kraft | 7 | 25 | 16 |
| Kraft | Aluminum | 12 | 32 | — |
| Kraft | Mylar | 4 | 17 | 26 |
| Kraft | Cellophane | 31 | 16 | 10 |
| Kraft | Polypropylene | 3 | 24 | — |
| Mylar | Aluminum | 11 | 42 | 52 |
| Cellophane | Alluminum | 12 | 63 | 44 |

Advantageously, the low-molecular weight terpene imide resins prepared in accordance with the process of the present invention possess the following overall properties:

| | |
| --- | --- |
| Softening Point, ° C | 70 – 110 |
| Color (Gardner, 50/50 Toluene) | 1 – 4 |
| Acid Number | 1 – 10 |
| Molecular Weight | 500 – 600 |
| Appearance | Clear, light-amber resin |
| Cloud Point$^a$ ° C. | 140 – 200 |
| Specific Gravity, 25°/25° C | 1.152 |
| Toluene Insolubles, % | 0.018 |

$^a$Cloud Point as determined above.

The terpene imide resins are soluble in aromatic hydrocarbons, chlorinated hydrocarbons, esters, ketones, ethers, and alcohols, but insoluble in aliphatic hydrocarbons. Due to their molecular weight and compatibility as shown by cloud point of about 160° C., the resins of the present invention find utility as tackifiers in polar formulations.

We claim:

1. A process for preparing terpene maleimide resins which comprises: reacting at temperatures between 140° C. and 200° C. substantially equimolar amounts of (a) a non-conjugated terpene or mixtures thereof and (b) maleic acid anhydride in the presence of from 0.05% to 0.15% iodine based on the weight of the terpene, recovering a mixture of not less than 85% mono-adduct and not more than 15% di-adduct of terpene maleic adducts, further reacting said adduct mixture with stoichiometric amounts of an aliphatic primary diamine, and recovering terpene maleimide resin having an average molecular weight between about 500 and about 600.

2. The process according to claim 1 wherein the terpene is terpinolene.

3. The process according to claim 1 wherein the terpene mixture comprises terpinolene and cineole.

4. The process according to claim 1 wherein the terpene is limonene.

5. The process according to claim 1 wherein the iodine added is 0.12%, based on the weight of the terpene reactant.

6. The process according to claim 1 wherein the diamine is ethylene diamine.

7. The process according to claim 1 wherein the polyamine is trimethylene diamine.

8. A resinous terpene maleimide having an average molecular weight ranging from about 500 to 600 and softening points ranging from 70° C. to 110° C., prepared by the process of claim 1.

* * * * *